2,821,545
POLYHYDRIC ALCOHOL ESTERS OF 2,2-DICHLOROBUTYRIC ACID

Herman O. Senkbeil, Charles T. Pumpelly, and Harry F. Brust, Midland, Mich., assignors to The Dow Chemical Company, Midland, Mich., a corporation of Delaware No Drawing. Application July 2, 1956
Serial No. 595,060

3 Claims. (Cl. 260—487)

This invention relates to the polyhydric alcohol esters of 2,2-dichlorobutyric acid. These new compounds are viscous liquids or crystalline solids, somewhat soluble in many organic solvents and of very low solubility in water. They have been found to be active as plant growth control materials and are adapted to be employed as active toxic constituents of compositions for the killing of weeds and for the sterilization of soil with regard to plant growth. The compounds are very persistent in soil and may be distributed in the soil to control the growth of seeds and established plants of many species over a prolonged period of time. The compounds are also useful as parasiticides for the control of insects and bacterial organisms such as *Rhizoctonia solani*.

The new compounds may be prepared by reacting 2,2-dichlorobutyric acid with a polyhydric alcohol such as ethylene glycol, propylene glycol, glycerol, erythritol, pentaerythritol and the di- and tri-alkylene glycols of the ethylene, propylene and trimethylene series, i. e., diethylene glycol, triethylene glycol, dipropylene glycol, tripropylene glycol, di(trimethylene) glycol, tri(trimethylene) glycol, hydroxyethoxypropanol, hydroxyethoxy propoxypropanol, hydroxyethoxyethoxypropanol and hydroxyethoxypropoxyethanol. Good results are obtained when the 2,2-dichlorobutyric acid is reacted with a polyhydric alcohol in stoichiometric proportions. If desired, a large excess of the acid or a small excess of the alcohol may be employed without any deleterious effect upon the course of the reaction. The reaction may be carried out in the presence of a catalyst such as sulfuric acid and preferably in a water-immiscible solvent such as ethylene dichloride or toluene. The continuous removal of the water of reaction from the reaction zone produces optimum yields of the desired ester products.

In carrying out the reaction, the polyhydric alcohol, 2,2-dichlorobutyric acid and catalyst, if employed, are mixed and heated at a temperature of 75° to 180° C. until the reaction is complete. The heating may be carried out under reduced pressure when operating at temperatures above the boiling point of water so as to remove the water of reaction as rapidly as it is formed. The reactants and catalyst, if employed, may also be dispersed in an inert organic solvent and heated at the boiling temperature of the mixture. During the reaction, a mixture of the solvent and water of reaction is continuously distilled, condensed and the solvent recovered and recycled.

Upon completion of the reaction, the desired ester product, if a liquid, is separated by fractional distillation under reduced pressure. If the desired product is a solid, it may be separated by filtration following removal of the reaction solvent. In an alternative method, the solvent mixture of the reaction product is neutralized with dilute aqueous sodium carbonate. The resulting mixture divides into an aqueous layer and a solvent layer. The solvent layer, which contains the ester product, is separated and washed several times with water. The washed mixture may be fractionally distilled under reduced pressure to separate the desired ester compound.

The following examples illustrate the invention but are not to be construed as limiting.

*Example 1.*—Diethylene glycol bis(2,2-dichlorobutyrate)

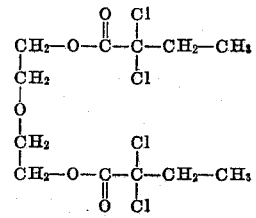

A mixture of 84 grams (0.54 mole) of 2,2-dichlorobutyric acid, 28.5 grams (0.27 mole) of diethylene glycol and 150 milliliters of ethylene dichloride was heated for 40 hours at a temperature of 101° to 113° C. The heating was carried out with continuous distillation of ethylene dichloride and the water of reaction as formed, separation of the water and recycling of ethylene dichloride. The reaction mixture was then fractionally distilled under reduced pressure to obtain a diethylene glycol bis(2,2-dichlorobutyrate) product as a viscous liquid boiling at 128°–142° C. at 0.05 millimeter pressure. This product had a refractive index $n/D$ of 1.4720 at 25° C., a saponification equivalent of 194 as compared to the theoretical value of 192, and a chlorine content of 35.66 percent as compared to a theoretical value of 36.98 percent.

*Example 2.*—Ethylene glycol bis(2,2-dichlorobutyrate)

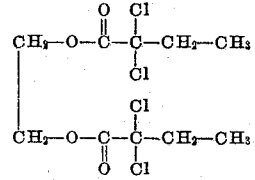

In a manner similar to that described in Example 1 an ethylene glycol bis(2,2-dichlorobutyrate) product may be prepared by reacting one mole of ethylene glycol and two moles of 2,2-dichlorobutyric acid. This product has a molecular weight of 335.

*Example 3.*—Trimethylene glycol bis(2,2-dichlorobutyrate)

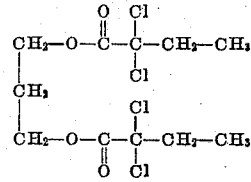

114 grams (1.5 moles) of trimethylene glycol and 471 grams (3 moles) of 2,2-dichlorobutyric acid are dispersed in 300 milliliters of ethylene dichloride and heated for about 22 hours at a temperature of about 125° C. The ethylene dichloride and water of reaction are continuously distilled from the reaction zone, the water separated and the ethylene dichloride recycled. The mixture is then fractionally distilled under reduced pressure to obtain the desired product as a viscous liquid having a molecular weight of 350.

*Example 4.*—Glycerol tris(2,2-dichlorobutyrate)

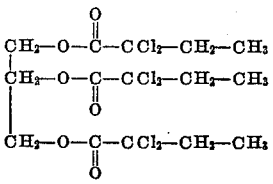

A mixture of 79 grams (0.5 mole) of 2,2-dichlorobutyric acid, 15.5 grams (0.17 mole) of glycerol and 100 milliliters of ethylene dichloride was heated at the boiling temperature for 36 hours. During this time the water of reaction and some of the ethylene dichloride were continuously distilled from the reaction zone. The reaction mixture was then fractionally distilled under reduced pressure to obtain a glycerol tris(2,2-dichlorobutyrate) product as a viscous liquid boiling at 174° to 184° C. at 0.3 millimeter pressure. This product had a saponification equivalent of 172 as compared to a theoretical value of 169 and a chlorine content of 40.29 percent as compared to the theoretical value of 41.7 percent.

*Example 5.—Pentaerythritol tetrakis(2,2-dichlorobutyrate)*

One mole of pentaerythritol and 4.4 moles of 2,2-dichlorobutyric acid are dispersed in 300 milliliters of toluene and the resulting mixture heated in the usual fashion for about 40 hours at a temperature of 110° to 120° C. The toluene is then recovered from the mixture by distillation to obtain a pentaerythritol tetrakis(2,2-dichlorobutyrate) product having a molecular weight of 645.

In a similar manner other polyhydric alcohol esters of 2,2-dichlorobutyric acid may be prepared of which the following are representative:

1 - (2 - hydroxyethoxy)-2-propanol bis(2,2-dichlorobutyrate) by the reaction of 2,2-dichlorobutyric acid and 1-(2-hydroxyethoxy)-2-propanol.

Erythritol tetrakis (2,2-dichlorobutyrate) by the reaction of erythritol and 2,2-dichlorobutyric acid.

Tri(trimethylene) glycol bis(2,2-dichlorobutyrate) by the reaction of 2,2-dichlorobutyric acid and tri(trimethylene) glycol.

Triethylene glycol bis(2,2-dichlorobutyrate) by the reaction of triethylene glycol and 2,2-dichlorobutyric acid.

Propylene glycol bis(2,2-dichlorobutyrate) by the reaction of propylene glycol and 2,2-dichlorobutyric acid.

The new 2,2-dichlorobutyric acid esters have been found to be effective as herbicides and parasiticides. For such use the products may be dispersed on an inert finely divided solid and employed as dusts. Such mixtures may also be dispersed in water and employed as sprays. The products may likewise be employed as constituents of oil-in-water emulsions with or without a wetting, dispersing or emulsifying agent. In representative operations, 100 percent controls of canary grass have been obtained with aqueous compositions containing 500 parts by weight of diethylene glycol bis(2,2-dichlorobutyrate) per million parts of water.

The di- and tri-ethylene glycols employed as starting materials, as previously described, may be prepared by reacting ethylene glycol with ethylene oxide. The reaction may be carried out in the presence of a catalyst such as sulfuric acid or sodium hydroxide. In one such method, the reactants are mixed together in the presence of the catalyst and heated for about 0.5 hour at a temperature of 170° C. and a pressure of 200 pounds per square inch. The individual glycols can then be separated by subjecting the mixed reaction product to fractional distillation under reduced pressure.

1-(2-hydroxypropoxy)-2-propanol may be similarly prepared by reacting 1,2-propanediol with propylene oxide in the presence of sodium hydroxide, since propylene oxide reacts much faster with a primary alcohol than with a secondary alcohol, and in the presence of the alkaline catalyst, the oxide adds largely as a secondary alcohol. 2-(2-hydroxypropoxy)-1-propanol may be prepared by reacting 1-methoxy-2-propanol with propylene oxide in the presence of an alkaline catalyst to produce 1-(2-methoxyisopropoxy)-2-propanol. The latter product is thereafter heated with hydrogen bromide to give the desired dipropylene glycol and methyl bromide. 2-(2-hydroxy-1-methylethoxy)-1-propanol may be prepared by the reduction of diethyl dilactylate with lithium aluminum hydride (LiAlH$_4$). The trialkylene glycols of the propylene series may be prepared by reacting these dipropylene glycols with propylene oxide in the presence of sodium hydroxide as catalyst. The term "alkylene" as employed in the present specification refers to any bivalent aliphatic hydrocarbon radical having two free valences attached to different carbon atoms. The polyhydric alcohols to be employed in accordance with the teachings of the specification and claims are those alcohols which are free of reactive groups other than hydroxyl.

The di- and tri-alkylene glycols of the tri-methylene series may be prepared by heating 1,3-propanediol with a dehydration catalyst such as iodine. The heating is carried out at a temperature of about 175° C. and with the continuous distillation and collection of water of reaction. Upon completion of the reaction as evidenced by the amount of water collected, the mixture may be extracted with a suitable organic solvent and the solvent extract fractionally distilled under reduced pressure to obtain the desired product.

The glycol-ethers containing mixed alkylene units may be prepared by reacting a propanediol, dipropylene glycol or di(trimethylene) glycol and ethylene oxide in the presence of sodium hydroxide. In a similar manner, other mixed glycol ethers may be prepared by reacting diethylene glycol or a mixed glycol-ether with propylene oxide. Other of the mixed glycol-ethers may be prepared by reacting 1,3-propanediol with mixed glycol-ethers of suitable unmixed dialkylene glycols in the presence of iodine as catalyst.

We claim:

1. A fully esterified reaction product of 2,2-dichlorobutyric acid with an aliphatic polyhydric alcohol containing not to exceed 9 carbon atoms.

2. Diethylene glycol bis(2,2-dichlorobutyrate).

3. Glycerol tris(2,2-dichlorobutyrate).

References Cited in the file of this patent

UNITED STATES PATENTS

| | | |
|---|---|---|
| 2,693,407 | Swezey | Nov. 2, 1954 |
| 2,732,303 | Morgan et al. | Jan. 24, 1956 |
| 2,734,075 | Brust et al. | Feb. 7, 1956 |